Figure 1:
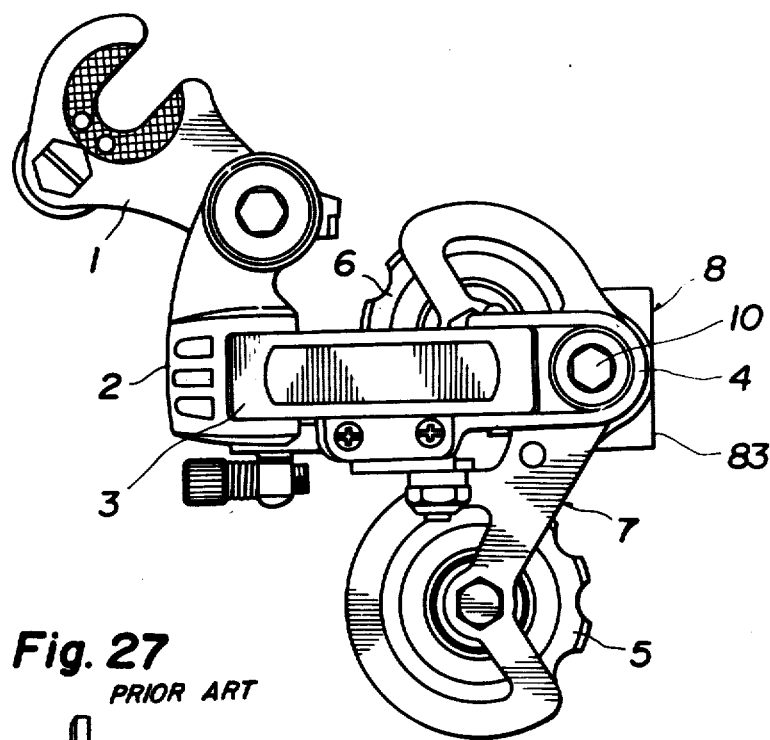

United States Patent [19]

Nagano et al.

[11] 4,198,874
[45] Apr. 22, 1980

[54] DERAILLEUR FOR BICYCLES AND SIMILAR VEHICLES

[75] Inventors: Masashi Nagano, Sakai; Mitsuhide Isobe, Toyonaka, both of Japan

[73] Assignee: Shimano Industrial Company Limited, Osaka, Japan

[21] Appl. No.: 905,973

[22] Filed: May 15, 1978

[30] Foreign Application Priority Data

May 20, 1977 [JP] Japan .................. 52/59211
Sep. 27, 1977 [JP] Japan .................. 52/130393[U]
Sep. 27, 1977 [JP] Japan .................. 52/130394[U]

[51] Int. Cl.² .................. F16H 9/00; F16H 11/00
[52] U.S. Cl. .................. 74/217 B; 280/238
[58] Field of Search .............. 74/217 B, 217 S, 217 C; 280/236, 238

[56] References Cited

U.S. PATENT DOCUMENTS

| 3,927,904 | 12/1975 | Bergles | 74/217 B X |
| 3,960,025 | 6/1976 | Juy | 74/217 B |
| 3,964,330 | 6/1976 | Ozaki | 74/217 B |
| 3,994,167 | 11/1976 | Juy | 74/217 B |
| 4,030,375 | 6/1977 | Nagano | 74/217 B |
| 4,061,048 | 12/1977 | Huret et al. | 74/217 B X |

FOREIGN PATENT DOCUMENTS

| 1161775 | 1/1964 | Fed. Rep. of Germany | 280/236 |
| 867834 | 11/1941 | France | 74/217 B |
| 315077 | 2/1934 | Italy | 280/236 |
| 96486 | 8/1939 | Sweden | 74/217 B |

*Primary Examiner*—Leslie Braun
*Attorney, Agent, or Firm*—Stevens, Davis, Miller & Mosher

[57] ABSTRACT

A derailleur serves to change the speed of a chain driven vehicle by moving a change-over frame having a tension and a guide pulley, the change-over frame being formed of a single plate and provided with a chain holder positioning radially outwardly of the guide pulley and keeping engagement of a driving chain therewith. Interaction between the change over frame and chain during the shifting of speed is substantially reduced. Chain position is maintained by means of a chain holder reducing chain interference with the change over frame. The chain may be removed with a minimum effort without special tools.

12 Claims, 27 Drawing Figures

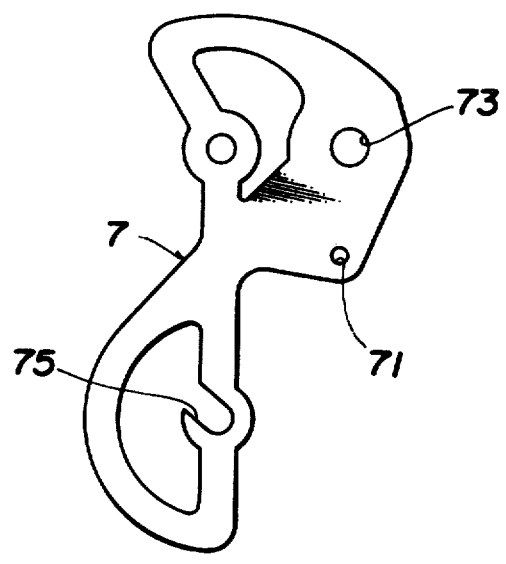
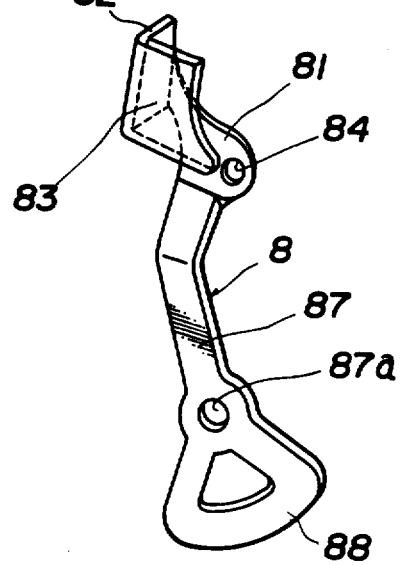
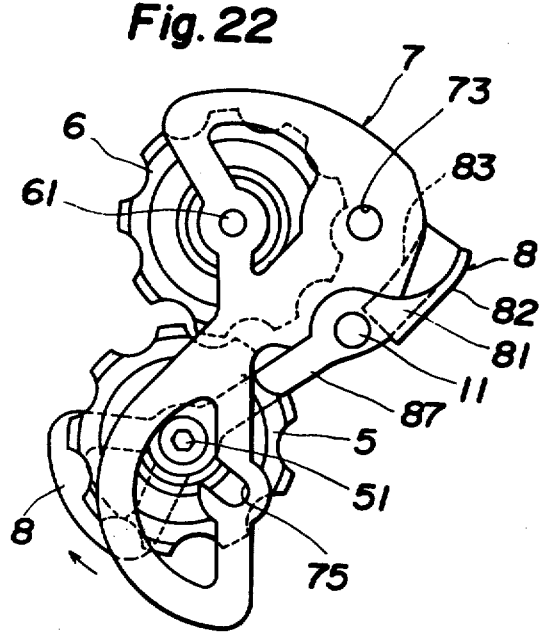
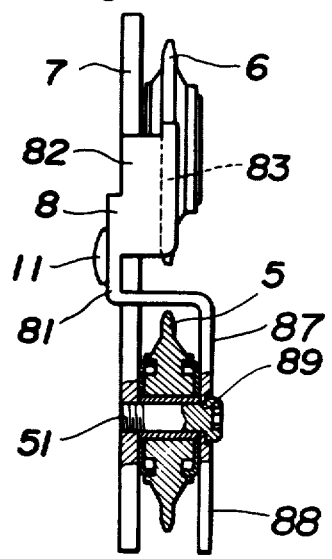

DERAILLEUR FOR BICYCLES AND SIMILAR VEHICLES

This invention relates to a derailleur for bicycles and other vehicles and more particularly to the derailleur for these vehicles (hereinafter referred to as the bicycle), which is used in association with multi-speed sprockets at the rear hub so that a driving chain may be shifted to one of the sprockets.

Generally, this kind of a derailleur is so constituted that a base member fixed to the bicycle frame carries a movable member through linkage members in relation of being movable axially with respect to the sprockets, the movable member providing a change-over frame which is pivoted thereto and carries a tension and guide pulleys in mesh with the driving chain.

The derailleur is mounted axially outwardly of a high speed sprocket and the driving chain is stretched on the tension and guide pulleys so that a control wire is pulled to move the movable member toward a low speed sprocket having the largest number of teeth against a return spring and toward the high speed sprocket having the smallest number of teeth by restoration of the spring, thereby permitting shifting the chain to one of the multi-speed sprockets.

Figure 27:
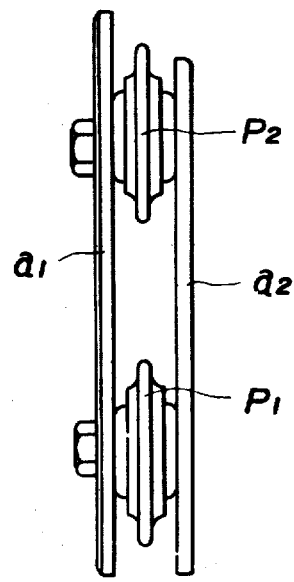

The change-over frame of the derailleur is, as shown in FIG. 27, entirely formed in a frame-like shape and comprises two opposite plates $a_1$ and $a_2$, spaced at a given interval. The plate $a_1$ is positioned axially inwardly of the tension and guide pulleys $p_1$ and $p_2$, i.e., at the movable member side, so as to support both the pulleys $a_2$ is positioned axially outwardly thereof for guiding the driving chain running on the pulleys.

Both the plates $a_1$ and $a_2$ are usually spaced at a relatively large interval in comparison with the chain width, whereby the chain tends to lean to contact with either of the plates when changing the bicycle speed, thus causing heavy cranking and clicking sounds, resulting in poor efficiency of the speed change.

For eliminating the aforesaid problem, it is enough that both the plates are narrowly spaced, but the chain, even when the speed is not changed, approaches either one of the plates to contact therewith, thereby hindering the chain from smoothly running on the pulleys.

In view of the aforesaid problems, this invention has been designed. A main object of the invention is to provide a derailleur capable of preventing the driving chain from leaning when changing the speed, thereby improving the speed change function without heavy cranking and noises.

Another object is to provide a derailleur capable of placing or removing the chain on or from the pulleys quickly and readily.

The invention is characterized in that the change-over frame of a single plate carries the tension and guide pulleys and has a chain holder provided radially outward from the guide pulley to thereby keep the proper engagement of the chain therewith.

In other words, the invention is characterized in that the change-over frame pivoted to the movable member is formed of a single plate in place of the conventional cage-like frame of two plates connected with the pulley shafts, and the chain holder is provided at the change-over frame radially outward from the guide pulley so that the driving chain may be prevented from leaning when meshed with the guide pulley.

The change-over frame of the invention has the chain holder positioned radially outward from the guide pulley, whereby the chain is prevented from leaning at or near the teeth of the pulley, and the chain holder is spaced narrowly therefrom so as to prevent the chain from leaning, thus improving the speed change function.

Furthermore, the chain holder, which is attached to the change-over frame, can be incorporated therewith, or be separated therefrom to be movable radially outward from the guide pulley to thereby facilitate removing or placing the chain on the guide and tension pulleys.

Figure 2:
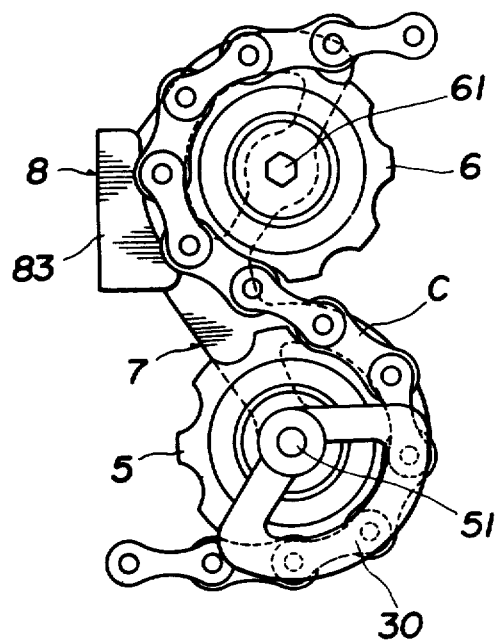
Figure 3:
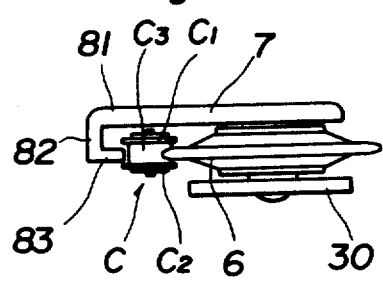
Figure 4:
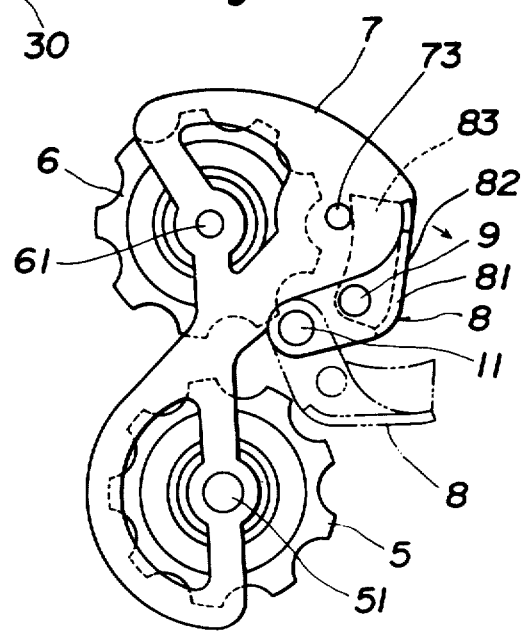
Figure 5:
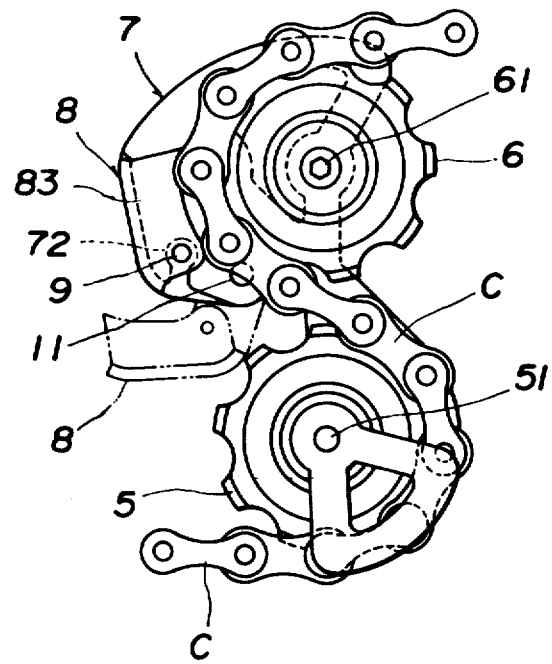
Figure 6:
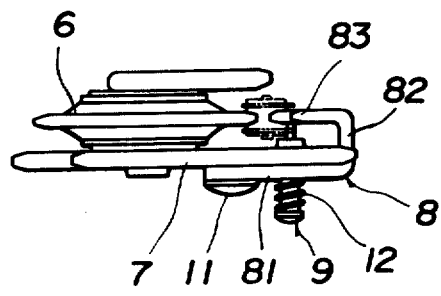
Figure 7:
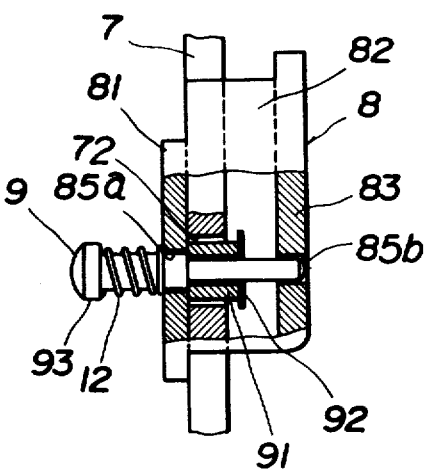
Figure 8:
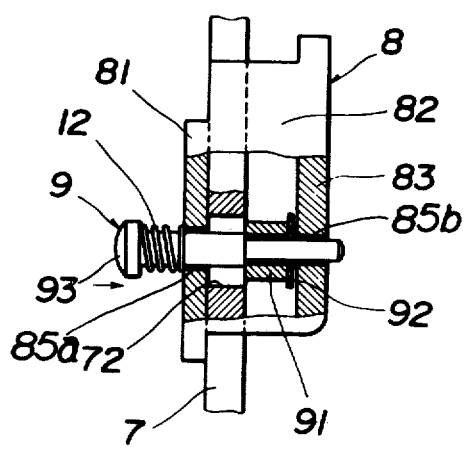
Figure 9:
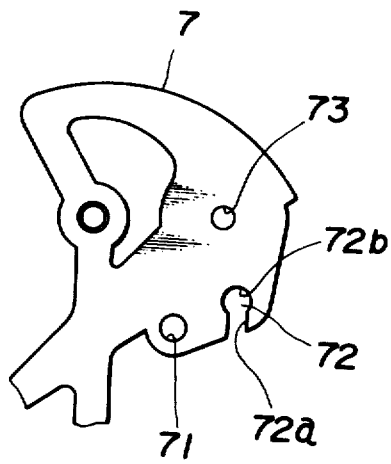
Figure 10:
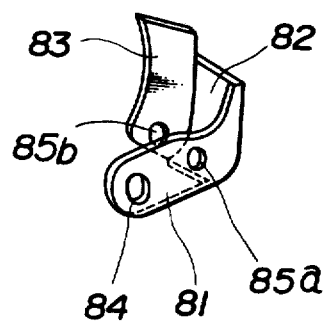
Figure 11:
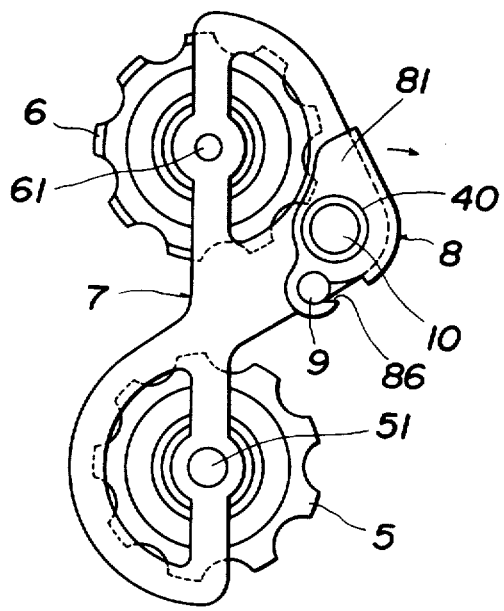
Figure 12:
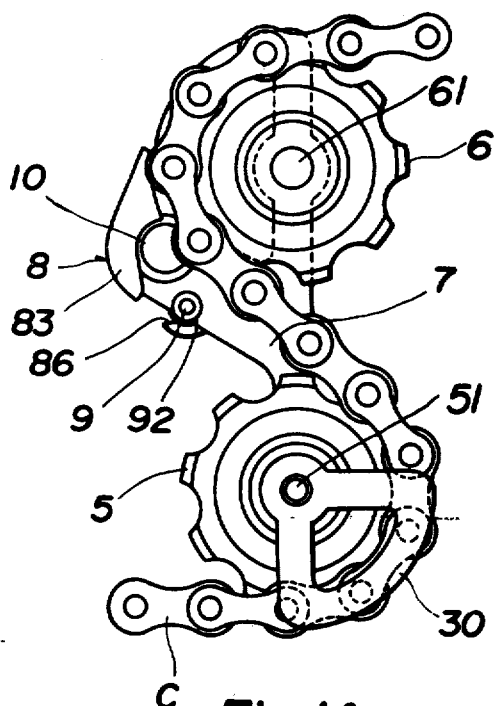
Figure 13:
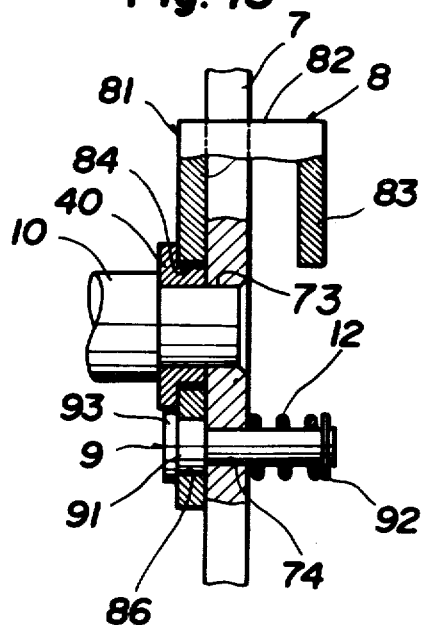
Figure 14:
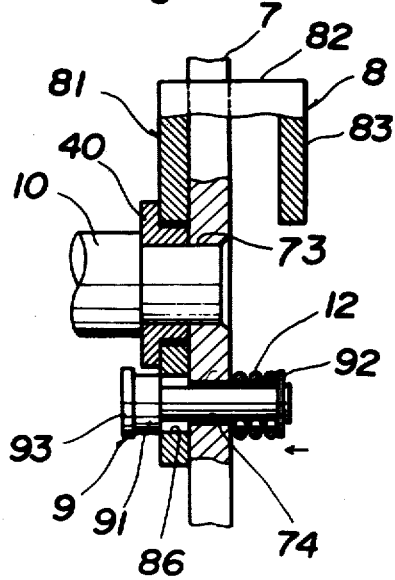
Figure 15:
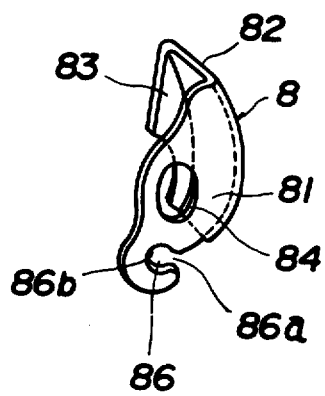
Figure 16:
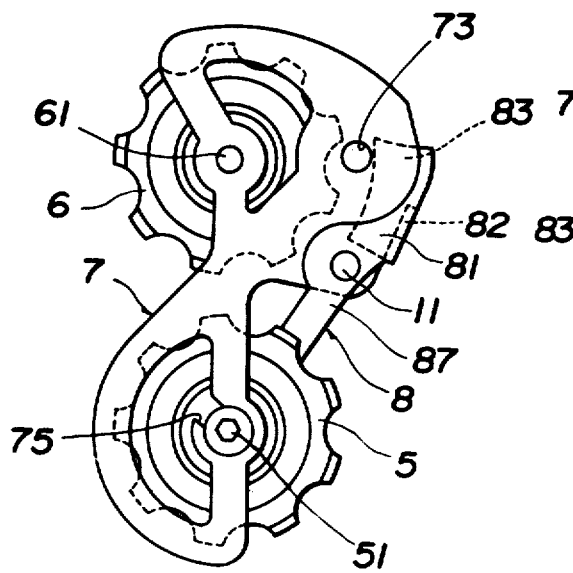
Figure 17:
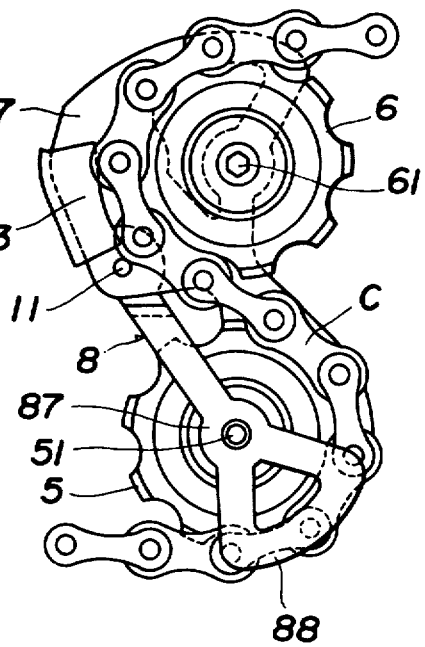
Figure 18:
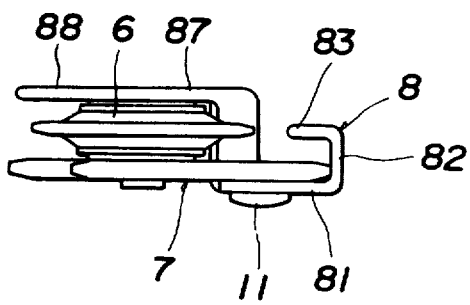
Figure 19:
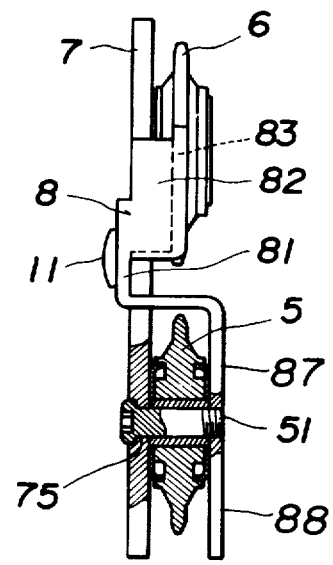
Figure 24:
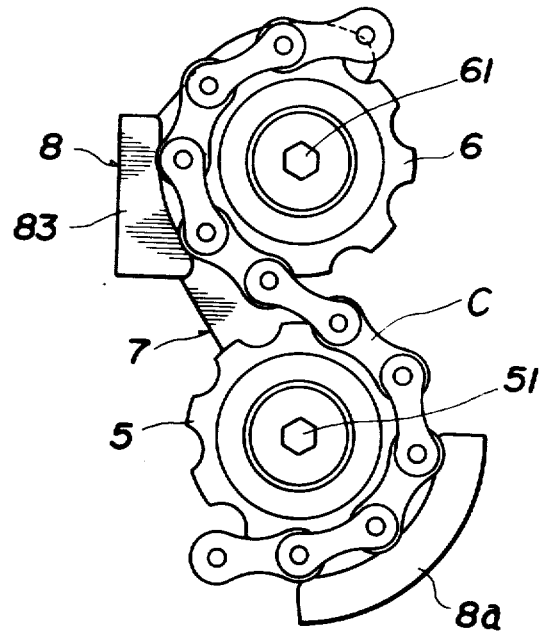
Figure 25:
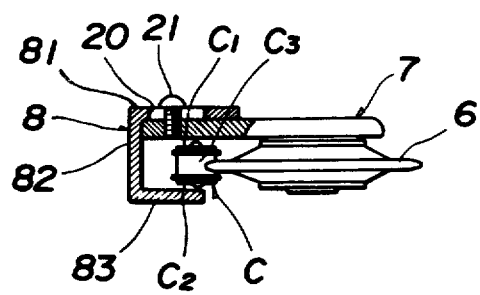
Figure 26:
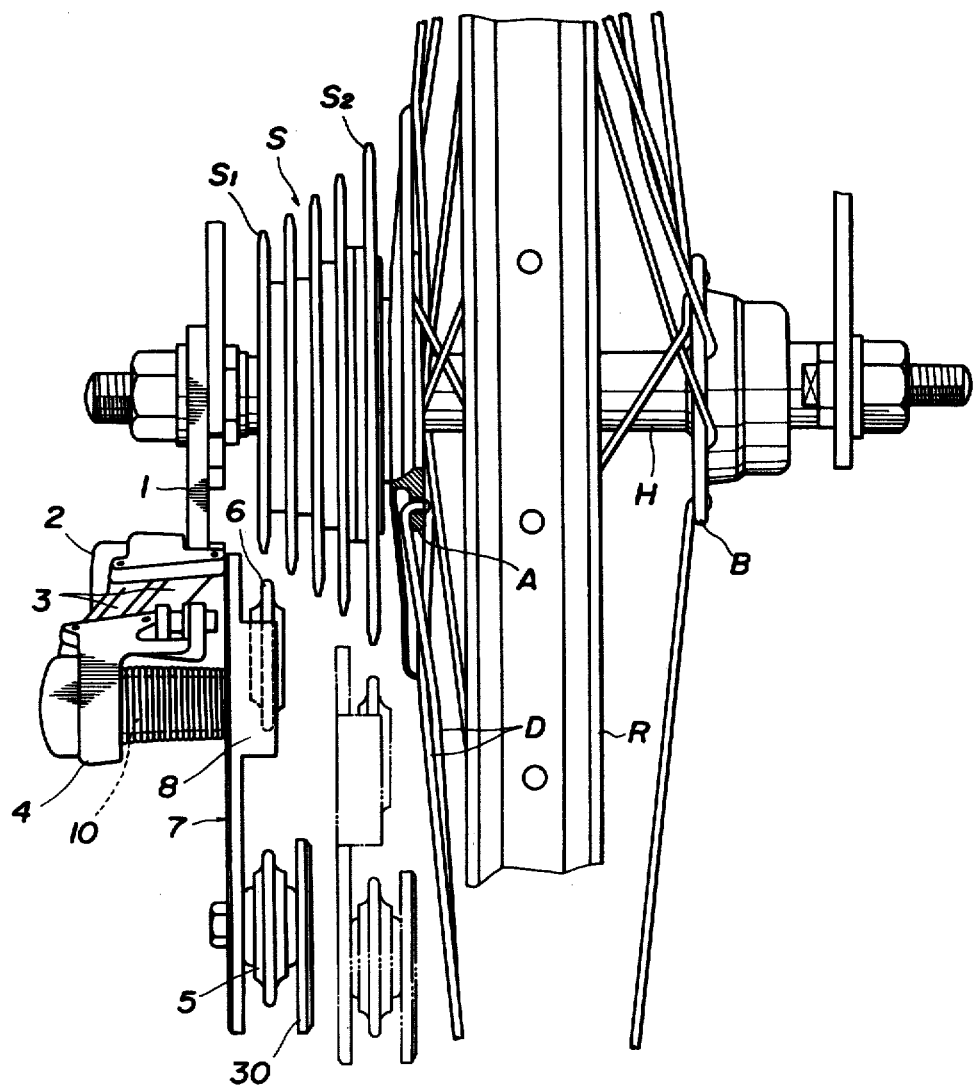

Further objects and advantages of the present invention will be apparent from the following description and claims and from the drawings in which:

FIG. 1 is a front view of an embodiment of the invention,

FIG. 2 is a rear view of the change-over frame of the invention, showing its guide and tension pulleys on which the driving chain is stretched, FIG. 3 is a plan view thereof, FIG. 4 is a front view of a modified embodiment of the change-over frame corresponding to that in FIG. 2, FIG. 5 is a rear view thereof, FIG. 6 is a plan view of the change-over frame in FIG. 4, FIG. 7 is a partially cutaway and enlarged side view of the embodiment of the change-over frame in FIGS. 4 and 5, FIG. 8 is the same view thereof, in which the change-over frame is operated differently from FIG. 7, FIG. 9 is a partially front view only of the change-over frame of the embodiment in FIG. 4, FIG. 10 is a perspective view only of the chain holder of the embodiment in FIG. 4, FIG. 11 is another modified embodiment of the change-over frame corresponding to that in FIG. 2, FIG. 12 is a rear view thereof, FIG. 13 is a partially cutaway and enlarged view of the embodiment in FIGS. 11 and 12, FIG. 14 is the same view of the change-over frame operated differently from FIG. 3, FIG. 15 is a perspective view of the chain holder of the embodiment in FIGS. 11 and 12, FIG. 16 is a front view of still another modified embodiment of the change-over frame corresponding to that in FIG. 2, FIG. 17 is a rear view thereof, FIG. 18 is a plan view of the change-over frame in FIG. 16, FIG. 19 is a partially cutaway side view thereof, FIG. 20 is a front view only of the change-over frame of the embodiment in FIGS. 16 and 17, FIG. 21 is a perspective view only of the chain holder thereof, FIG. 22 is a front view of the embodiment in FIG. 16, in which the change-over frame is operated differently therefrom, FIG. 23 is a partially cutaway side view of a further modified embodiment of the change-over frame corresponding to that in FIG. 19, FIGS. 24 and 25 being views of still further modified embodiments respectively, FIG. 24 is a rear view of the change-over frame thereof corresponding to that in FIG. 2, FIG. 25 is a partially cutaway plan view of the change-over frame corresponding to that in FIG. 3, FIG. 26 is a diagram of the embodiment in FIGS. 1 and 2, showing its function when attached to the rear hub of the bicycle, and FIG. 27 is a side view of a conventional change-over frame.

The derailleur shown in FIG. 1, comprises a base member 2 having a mounting bracket 1 for mounting the bracket to the bicycle frame and a movable member 4 connected movably to the base member 2 through a pair of linkage members 3 and carrying a change-over frame 7 which has a tension pulley 5 and guide pulley 6 and is pivoted to the movable member 4 in relation of being swingable through a pivot 10. The derailleur is, as shown in FIG. 26, attached to a rear hub H axially outward from a high speed sprocket $S_1$ of multi-speed sprockets S, and a driving chain C is stretched on both the pulleys 5 and 6 so that a control wire is pulled to move the movable member 4 toward a low speed sprocket $S_2$ having the largest number of teeth against a return spring (not shown) or toward the high speed one having the smallest number of teeth by use of restoration of the spring, thereby shifting the chain to one of the sprockets S. In addition, the reference letters A and B designate flanges of the rear hub H; D, spokes mounted to the flanges; and R, wheel rim.

In the derailleur of the invention, the change-over frame 7 is formed of a single plate member and provided with a chain holder 8 positioned radially outward from the guide pulley 6 and holding the engagement of the driving chain therewith.

In detail, in FIG. 2 the change-over frame 7 of a single plate has at its both ends shaft holes one of which is inserted with a pulley shaft 51 rotatably supporting therewith the tension pulley 5, and the other, with that 61 supporting the guide pulley 6 in the same manner. The chain holder 8 is mounted to the change-over frame at the chain entry side thereof.

Referring to FIg. 3, the chain holder 8 comprises a support 81 extending in parallel to the change-over frame 7 and radially outwardly of the guide pulley 6, a connector 82 extending axially thereof, and a plate-like nose 83 extending in parallel to the change-over frame 7 and radially inwardly of the guide pulley 6, which are formed in succession. The chain holder 8 also is so mounted to the change-over frame 7 that the end of nose 83 is located radially outward from the guide pulley 6.

The support 81 may, other than incorporated with the change-over frame 7 as shown in FIGS. 2 and 3, be separately formed to be mounted in relation thereto and is movable with respect to the guide pulley 6.

The nose 83 is, as shown in FIGS. 3, 6 and 18, opposite at its end face to the tips of teeth of the guide pulley 6 and is as close as contactable with the inner surfaces of link plates $C_1$ and $C_2$ of the chain C in mesh with the teeth, besides this, the nose 83 may be arranged to be positioned at its end axially outward from the teeth of guide pulley 6 so that the end may be as close as contactable with the outer surface of the outer link plate $C_2$ as shown in FIG. 25.

In the case that the nose 83 is opposite to the tips of teeth of the guide pulley 6, the end face of the same is spaced at a given interval from rollers $C_3$ of the chain C, and is made slightly smaller in width than an interval between both the link plates $C_1$ and $C_2$ so as to enter therebetween, thereby preventing the driving chain C, when shifted for changing the speed, from leaning between the guide pulley 6 and the sprocket S. Even if the chain slightly leans, the roller $C_3$ thereof abuts against the end face of the nose 83, thereby allowing the chain to run smoothly on the guide pulley.

Accordingly, the nose 83 opposite to the teeth of guide pulley 6 prevents the driving chain from leaning so that the speed change may be made effective by light cranking and no noises occur in the absence of contact of the chain pins with the inner side of the change-over frame 7.

Furthermore, there is no need for a chain guide plate $a_2$ to be mounted axially outward from the guide pulley 6 of the conventional change-over frame as shown in FIG. 27, whereby the change-over frame 7 is movable without fear of being hit by the spokes D, thus making it possible to bring the change-over frame, in turn, the multi-speed sprockets, near the hub flange to that extent so that an offset of the change-over frame may be reduced. As a result, the spokes become more durable while stably supporting the bicycle wheel.

Next, the construction of the chain holder 8 which is separated from the change-over frame 7 and movably mounted thereto, will be detailed in the following description.

In this construction, the chain holder 8 is mounted to the change-over frame 7 so there it is swingable or slidable with respect thereto.

In the embodiment shown in FIGS. 4 through 10, the chain holder 8 is pivoted to the change-over frame 7 in relation of being swingable with respect thereto through a pivot 11. The pivot 11 is insertably fixed at its one end to a bore 71 formed at the change-over frame 7 as shown in FIG. 9 and inserted at the other end into a bore 84 formed at the support 81 of the chain holder 8 to thereby pivotally support the chain holder 8 through caulking or the like.

Furthermore, means is provided for keeping the chain holder 8 in position radially outwardly of the guide pulley 6.

The keeping means is so constructed that at the support 81 and nose 83 of the chain holder 8 are formed bores 85a and 85b through which a pin 9 is axially movably inserted. At the change-over frame 7 is formed a cutout 72 with which the pin 9 is insertably engaged, thereby keeping the holder 8 in position with respect to the guide pulley 6.

In greater detail, the pin 9 is headed as shown in FIGS. 7 and 8, and is sleeved at its substantially intermediate portion with a ring 91 which is larger in diameter than the pin 9 and fixed thereto by a stopper 92. The pin 9 is inserted into the bores 85a and 85b through the ring 91 sandwiched between the support 81 and the nose 83 and is protrudent at the head from the support 81 to provide a spring 12 between the head and the support so that the pin 9 is urged always toward the outer side of the support 81 until the ring 91 abuts against the inner surface thereof.

The cutout 72 at the change-over frame 7 has an opening 72a of width larger than the outer diameter of the pin 9 and smaller than that of the ring 91 and has a round bottom 72b larger in diameter than the opening 72a. The bottom 72b is engaged with the ring 91 to fix the nose 82 detachably to the change-over frame 7, thereby keeping the nose 83 in position with respect to the guide pulley 6. The chain holder 8 detachably mounted to the change-over frame 7 enables the chain C to be desirably placed on or removed from the guide and tension pulleys 6 and 5 in such a manner that when the chain C is stretched onto the pulleys 5 and 6, the pin 9 is, as shown in FIG. 8, at first pushed against the spring 12 in the direction of the arrow, the ring 91 at the pin 9 is disengaged from the bottom 72b at the change-over frame 7, and the chain holder 8 is turned in the direction of the arrow in FIG. 4 around the pivot 11 so as to escape from the bottom 72b through the opening 72a of the cutout 72, thus allowing the nose 83 to leave the tips of teeth of guide pulley 6 radially thereof.

On the other hand, when the chain holder 8 is secured to the change-over frame 7, the pin 9 is pushed against the spring 12, the chain holder 8 is turned counterclockwise around the pivot 11, and the pin 9 is inserted into the bottom 72b through the opening 72a and then the spring 12 is released, whereby the pin 9 is axially moved by the spring 12 force so that the ring 91 is engaged with the bottom 72b, thus fixing the chain holder 8 through the engagement. In FIGS. 4 and 9, a bore 73 is to be inserted with the aforesaid pivot 10.

Other than the aforesaid embodiment in which the chain holder 8 is pivoted to the change-over frame 7 and the cutout 72 thereat is engaged with the pin 9 at the chain holder 8, the pivot 10 for the movable member 4 may, as shown in FIGS. 11 through 15, be used for pivoting the chain holder 8 to the change-over frame 7 and the pin 9 may be supported thereto and a cutout 86 may be formed at the chain holder 8.

In this instance, between the movable member 4 and the change-over frame 7 is inserted a flanged washer 40 which is fixedly sleeved onto the pivot 10. The chain holder 8 is inserted through its bore 84 onto the washer 40, thereby being carried therewith in relation of being swingable. The change-over frame 7 has at the chain entry side thereof with respect to the guide pulley 6 a bore 74 into which the pin 9 having at its substantially intermediate portion a swollen portion 91 is inserted axially movably. The cutout 86 formed at the chain holder 8 receives the pin 9 into a bottom 86b of the same, thereby engaging the bottom 86b with the swollen portion 91 of the pin 9.

In addition, the head 93 and swollen portion 91 of the pin 9 are integrated and a stopper 92 is provided at the tip of the pin 9. The pin 9 is insertably supported to the bore 74 and its tip is projected toward the guide pulley 6. Between the stopper 92 and the change-over frame 7 is inserted the spring 12 so that the spring 12 may keep the engagement of the swollen portion 91 with the bottom 86b of the cutout 86.

In this construction, for stretching the chain C onto the guide pulley 6, the pin 9 is at first pushed against the spring 12 in the direction of the arrow in FIG. 14, the swollen portion 91 is disengaged from the bottom 86b, and then the chain holder 8 is turned around the pin 9 in the direction of the arrow in FIG. 11, whereby the nose 83 leaves the tips of teeth of guide pulley 6 radially outwardly thereof.

Such a construction has the same advantages as the former embodiment, that is, the chain C is prevented by the nose 83 from its leaning when running on the pulley for changing the speed, thereby making the speed change effective and eliminating heavy cranking and noises by preventing contact of the pins of the chain with the inner surface of the change-over frame 7.

Furthermore, the chain holder 8 pivoted to the change-over frame 7 in relation of being swingable thereto, the pin 9 having the swollen portion 91 and axially movably supported to one of the chain holder 8 and change-over frame 7, and the cutout 72 or 86 provided at the other to have the bottom engageable with the swollen portion 91, make it possible to allow the nose 83 to leave the tips of teeth of the guide pulley 6 in a simple action of axially pushing the pin 9 to disengage the swollen portion 91 from the bottom and swinging the chain holder 8, whereby the chain C can be stretched onto or removed from the pulleys quickly and easily without any particular tool.

The aforesaid embodiments have the pin 9 in engagement with the cutouts 72 and 86 to fix the chain holder 8 in position, but the pulley shaft 51 may be used for this purpose as shown in FIGS. 16 through 23.

In detail, the pulley shaft 51 is used in such a manner that the chain holder 8 is, as shown in FIGS. 16 through 22, extended toward the tension pulley 5, the end portion of the extension supports the tension pulley 5 through its shaft 51, and the change-over frame 7 is provided with a cutout 75 in engagement with the pulley shaft 51, and that the pulley shaft 51 is, as shown in FIG. 23, supported to the change-over frame 7 and a cutout 89 is provided at the end portion of the extension of chain holder 8.

In the foregoing construction, the chain holder 8 is, as shown in FIG. 21, extended at the support 81 to form an extension 87. When the pulley shaft 51 is supported to the chain holder 8, the extension 87 is provided with a bore 87a for supporting therein the pulley shaft 51 and with a guide plate 88 for the tension pulley 5. The change-over frame 7 is, as shown in FIG. 20, provided with a cutout 75 formed in position to receive the pulley shaft 51. The cutout 75 is open to meet the line of movement of the shaft 51 when the chain holder 8 swings around the pivot 11.

The pulley shaft 51 is insertably engaged with the cutout 75 to keep the nose 83 in position radially from the guide pulley 6. The tension of the driving chain C stretched onto the pulleys 5 and 6 is applied to the pulley shaft 51 so as to be urged toward the bottom of the cutout 75, thereby securing the aforesaid holding of the nose 83.

On the other hand, the chain holder 8 is moved in the direction of the arrow in FIG. 22, thereby releasing the nose 83.

Next, when the pulley shaft 51 is supported to the change-over frame 7 as shown in FIG. 23, a cutout 89 is provided at the extension 87 of chain holder 8 to be insertably engaged with the pulley shaft 51 to thereby fix the chain holder 8, in which the function of keeping and releasing the nose 83 is the same as the former construction.

In addition, these embodiments can save the pin 9 at the former embodiment so that the chain holder is further simplified in construction.

Furthermore, the chain holder 8, which swings with respect to the change-over frame 7, may be made slidable as shown in FIG. 25.

In this instance, at one of the change-over frame 7 and support 81 at the chain holder 8 is provided a slot 20 and a screw thread at the other, so that a screw 21 is inserted into the slot 20 and screwed to the thread, whereby the chain holder 8 is movable along within the slot 20 with respect to the change-over frame 7 radially from the guide pulley 6, thereby fixing the chain holder 8 in position.

In the aforesaid embodiments, a chain guide plate 30 as shown in FIG. 2, separated from the change-over frame 7 may desirably be provided axially outward from the tension pulley 5, and also the chain guide plate 30 may be replaced by a chain holding member 8a constructed similarly to the chain holder 8 as shown in FIG. 25.

As many apparently widely different embodiments of this invention may be made without departing from the spirit and scope thereof, it is to be understood that the invention is not limited to the specific embodiments thereof except as defined in the appended claims.

What is claimed is:

1. A derailleur for shifting a driving chain to one of multi-speed sprockets of a vehicle said derailleur comprising;
   a base member;
   a movable member movably supported to said base member,
   a change-over frame pivotally supported to said movable member, said change-over frame comprising a single plate and carrying a tension and a guide pulley in relation of being rotable, said tension and guide pulleys having teeth in mesh with said driving chain respectively;
   a chain holder;
   means for mounting said chain holder to said change over frame;
   whereby said chain holder is movable radially outward from said guide pulley with respect to said change-over frame, for disengaging said chain from said guide pulley without cutting said chain; and
   means for fixing said chain holder in a position for preventing said chain from disengaging from said pulley when said chain holder is moved inward of said guide pulley.

2. The derailleur according to claim 1, wherein said chain holder and change-over frame are provided with through bores respectively, at least one of said through bores is formed in a slot, and said chain holder is attached to said change-over frame in relation of being slidable with respect thereto through a screw member.

3. The derailleur according to claim 1, wherein said chain holder is pivoted to said change-over frame in relation of being slidable therewith.

4. The derailleur according to claim 3, wherein said chain holder is mounted swingably to said change-over frame for positioning radially outward from said guide pulley, said chain holder having a cutout for receiving a pin, said change-over frame having a bore for supporting said pin; and a pin axially movable in said bore whereby said pin engages said cutout to keep said chain holder in position with respect to said guide pulley.

5. The derailleur according to claim 4, wherein said pin is headed at its one end and has at a substantially intermediate portion an engaging portion larger in diameter than said pin, said cutout is opened at an interval larger than the outer diameter of said pin and smaller than that of said engaging portion and has a bottom larger in diameter than said engaging portion, and a spring is provided between said pin and said change-over frame, thereby always engaging said engaging portion with said bottom.

6. The derailleur according to claim 3, wherein said chain holder has an extension facing said tension pulley radially thereof, the end of said extension being detachably engaged with a pulley shaft of said tension pulley.

7. The derailleur according to claim 3, wherein said chain holder is extended toward said tension pulley radially thereof, the end of which extension carries said tension pulley rotatably through said pulley shaft, whereby said pulley shaft is detachably engaged with said change-over frame.

8. The derailleur according to claim 3 wherein said chain holder is mounted swingably to said change-over frame for positioning radially outward from said guide pulley, said change-over frame having a cutout for receiving a pin, said chain holder having a bore for receiving a pin whereby said pin engages said cutout to keep said chain holder in position with respect to said guide pulley.

9. The derailleur according to claim 8, wherein said pin is headed at its one end and a substantially intermediate portion, an engaging portion larger in diameter than said pin, said cutout is opened at an interval larger than the outer diameter of said pin and smaller than that of said engaging portion, and has a bottom larger in diameter than said engaging portion, and a spring is provided between said pin and said chain holder supporting said pin, thereby always engaging said engaging portion with said bottom.

10. The derailleur according to claim 1, wherein said chain holder comprises a support extending in parallel to said change-over frame and radially outward from said guide pulley, a connector extending axially from said guide plate, and a holding plate extending in parallel to said change-over frame and radially inwardly of said guide pulley, which are arranged in succession, said holding plate positioned at its utmost end radially outward from said guide pulley, thereby keeping said driving chain in engagement with said guide pulley.

11. The derailleur according to claim 10, wherein the end face of said holding plate of the chain holder is opposite to the tips of teeth of said guide pulley and brought into contact with the inner surfaces of link plates of said driving chain in mesh with said teeth of the guide pulley, thereby keeping the mesh of said chain with said teeth.

12. The derailleur according to claim 10, wherein the end portion of said holding plate of the chain holder is positioned axially outward with respect to the teeth of said guide pulley, whereby said end portion is brought into contact with the outer surfaces of link plates at one side of the chain in mesh with said teeth.

* * * * *